(12) United States Patent
Landrum et al.

(10) Patent No.: US 10,723,161 B2
(45) Date of Patent: Jul. 28, 2020

(54) LEVELING COMPOSITIONS

(71) Applicant: Hewlett-Packard Development Company, L.P., Fort Collins, CO (US)

(72) Inventors: Paul C. Landrum, San Diego, CA (US); Xiaoqi Zhou, San Diego, CA (US); Xulong Fu, San Diego, CA (US); Francois K. Pirayesh, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/742,068

(22) PCT Filed: Sep. 18, 2015

(86) PCT No.: PCT/US2015/050931
§ 371 (c)(1),
(2) Date: Jan. 5, 2018

(87) PCT Pub. No.: WO2017/048276
PCT Pub. Date: Mar. 23, 2017

(65) Prior Publication Data
US 2018/0186160 A1 Jul. 5, 2018

(51) Int. Cl.
*B41M 5/52* (2006.01)
*B41M 5/50* (2006.01)
*B44C 1/24* (2006.01)
*C09D 11/30* (2014.01)
*B44B 5/02* (2006.01)
*B41M 5/00* (2006.01)
*C09D 179/02* (2006.01)

(52) U.S. Cl.
CPC ............ *B41M 5/52* (2013.01); *B41M 5/0011* (2013.01); *B41M 5/0082* (2013.01); *B41M 5/502* (2013.01); *B44B 5/026* (2013.01); *B44C 1/24* (2013.01); *C09D 11/30* (2013.01); *C09D 179/02* (2013.01); *B41M 5/5227* (2013.01); *B41M 5/5245* (2013.01); *B41M 2205/12* (2013.01); *B41M 2205/40* (2013.01)

(58) Field of Classification Search
CPC ...... B41M 5/52; B41M 5/0011; B41M 5/502; B44C 1/24; C09D 179/02; C09D 11/30; B44B 5/026
USPC ........................................................ 524/123
See application file for complete search history.

(56) References Cited

U.S. PATENT DOCUMENTS

| | | |
|---|---|---|
| 3,170,008 A | 2/1965 | Levine |
| 4,489,188 A | 12/1984 | Jones et al. |
| 5,236,987 A | 8/1993 | Arendt |
| 6,689,430 B2 | 2/2004 | Sadasivan et al. |
| 6,761,943 B1 | 7/2004 | Warner et al. |
| 6,796,650 B2 | 9/2004 | Brignone et al. |
| 6,821,329 B2 | 11/2004 | Choy |
| 7,151,131 B2 | 12/2006 | Kenworthy et al. |
| 7,296,883 B2 | 11/2007 | Kanaya et al. |
| 7,696,262 B2 | 4/2010 | Cagle et al. |
| 8,113,643 B2 | 2/2012 | Sarkisian et al. |
| 8,202,585 B2 | 6/2012 | Shultz et al. |
| 2005/0147769 A1 | 7/2005 | Ushiku |
| 2007/0202280 A1* | 8/2007 | Khoultchaev .......... B41M 5/502 428/32.24 |
| 2008/0014360 A1 | 1/2008 | Kim |
| 2008/0259100 A1* | 10/2008 | Rengaswamy ........ C09D 11/30 347/1 |
| 2011/0217489 A1 | 9/2011 | Kaimoto et al. |
| 2012/0277366 A1 | 11/2012 | Mis et al. |
| 2013/0040131 A1 | 2/2013 | Sugino et al. |
| 2014/0212591 A1* | 7/2014 | Swei ..................... C09D 4/06 427/385.5 |

FOREIGN PATENT DOCUMENTS

| | | |
|---|---|---|
| CN | 1173835 | 11/2004 |
| CN | 1576046 | 2/2005 |
| CN | 102171002 | 8/2011 |
| EP | 1410920 | 4/2004 |
| EP | 2050784 | 4/2009 |
| JP | 2006015639 | 1/2006 |
| JP | 2006272783 | 10/2006 |
| WO | 9955537 | 11/1999 |
| WO | 03016045 | 2/2003 |
| WO | WO 2014/014453 | * 1/2014 |
| WO | WO 2014/042652 | * 3/2014 |

OTHER PUBLICATIONS

International Search Report dated Jun. 2, 2016 for PCT/US2015/050931, Applicant Hewlett-Packard Development L.P. Company.

* cited by examiner

Primary Examiner — Doris L Lee
(74) Attorney, Agent, or Firm — Thorpe North & Western LLP (57) ABSTRACT

The present disclosure is drawn to leveling compositions, which can include from 80 wt % to 95 wt % water, from 0.5 wt % to 15 wt % organic solvent, and from 0.2 wt % to 6 wt % surfactant. The leveling compositions can further include from 1 wt % to 10 wt % cationic ionene polymer having a weight average molecular weight from 100 Mw to 8000 Mw, and from 1 wt % to 10 wt % polymeric binder.

8 Claims, 2 Drawing Sheets

LEVELING COMPOSITIONS

BACKGROUND

Inkjet printing technology has been used in all fields of printing applications, from traditional home and office usage to high-speed, commercial, and industrial printing. This is, in part, because of its ability to produce economical, high quality, multi-colored prints. Various types of media have been used for inkjet imaging, including porous media, smooth media, offset media, coated media, etc. Media with texture has also been used for printing substrates, but the use of such textured media can be challenging for certain print technologies.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Reference will now be made to several examples that are illustrated herein, and specific language will be used herein to describe the same. It will nevertheless be understood that no limitation of the scope of the disclosure is thereby intended.

DETAILED DESCRIPTION

Inkjet printing has permeated many fields where imaging is desirable due in part to its potential to generate high image quality under various printing conditions and with various print finishes. For example, some users of digital printed media desire to print on "embossed" surfaces. Embossing has generally been part of a process by which a texture is introduced into a surface of a media substrate during manufacturing. Subsequent printing on an embossed surface can provide an aesthetically desirable end product. However, as the texture depth is increased and the surface becomes increasingly rough, some print systems, such as inkjet systems, have trouble producing acceptable image quality. In these instances, ink can pool in the "valleys" of the textured surface, causing the "peaks" to absorb less ink or to be thinly coated. In other words, "ink puddling" can occur in the valleys resulting in non-uniform ink coverage and unacceptable image quality.

The present disclosure relates to solving this ink puddling problem, which can improve the printing image quality on surfaces prone to ink puddling, including embossed surfaces.

Accordingly, the present disclosure is drawn to leveling compositions. In some examples, a leveling composition can include from 80 wt % to 95 wt % water, from 0.5 wt % to 15 wt % organic solvent, and from 0.2 wt % to 6 wt % surfactant. Other liquid components can also be present that form a liquid vehicle. The leveling composition also includes from 1 wt % to 10 wt % cationic ionene polymer having a weight average molecular weight from 100 Mw to 8000 Mw dispersed in the liquid vehicle, and from 1 wt % to 10 wt % polymeric binder.

In further detail regarding the leveling composition, the formulation can be devoid of colorant. In another example, colorant can be present. Still in other examples, optical brighteners, whitening agents, or other additives can be present as desired. In another example, the leveling composition can include a flame retardant. In another example, the water can be present at from 85 wt % to 90 wt %, the organic solvent can be present at from 1 wt % to 10 wt %, the surfactant can be present at from 0.3 wt % to 3 wt %, the cationic ionene polymer can be present at from 2 wt % to 8 wt %, and the polymeric binder can be present at from 1 wt % to 8 wt %.

In another example, an embossed print medium can include a media substrate, an image-receiving layer applied to the media substrate at a coating weight of 3 gsm to 50 grams per square meter (gsm), wherein the image-receiving layer is embossed, and a leveling composition layer is applied to the image receiving layer at a coating weight of 0.2 gsm to 3 gsm. The image-receiving layer can include a pigment filler having an average particle size ranging from 0.1 µm to 20 µm and a polymeric binder. The leveling composition layer can include water, an organic solvent (for example that combines with water to form a liquid vehicle), and a cationic ionene polymer dispersed in the liquid vehicle.

In certain specific examples, the image-receiving layer can be embossed prior to application of the leveling composition, or can be embossed after application of the levering composition. In either case, the leveling composition can act to prevent puddling that may otherwise occur in the valleys of the embossed image. In still further detail, the leveling layer can further include a polymeric binder, a flame retardant, and/or a surfactant. Furthermore, the image-receiving layer can be applied at a coating weight of 5 gsm to 30 gsm and/or the leveling composition layer is applied at a coating weight of 0.5 gsm to 2 gsm. In still further detail, the embossed print medium can also include a base layer applied between the print media and the image-receiving layer.

In another example, a method of preparing an embossed print medium can include applying an image-receiving layer to a media substrate at a coating weight of 3 gsm to 50 gsm, applying a leveling composition layer to the image-receiving layer at a coating weight of 0.2 gsm to 3 gsm, and embossing either the image-receiving layer or the leveling composition layer after application. The image-receiving layer can include a pigment filler having an average particle size ranging from 0.1 µm to 20 µm and a polymeric binder. The leveling composition that is applied to the image-receiving layer can include a liquid vehicle including water and an organic solvent at a ratio of from 1:1 to 98:2, and a cationic ionene polymer dispersed in the liquid vehicle. In one example, the image-receiving layer is embossed prior to application of the leveling composition layer, and in another example, the image-receiving layer is embossed after application of the leveling composition, i.e. through the leveling composition.

The textured media can be created by embossing and un-embossing techniques. Such techniques are the processes of creating either raised or recessed relief images and designs in paper and other materials. An embossed pattern is raised against the background, while an un-embossed pattern is sunken into the surface of the material. In some examples, the textured media is a media that has been embossed and is capable of retaining its inherent imaging and performance properties. The textured media can be obtained by embossing a pattern into a media via passing said media between rollers with a patterned surface. For purposes of the present disclosure, the term "embossed" includes both textured media that is either embossed by raising a pattern against a background, un-embossed by sinking a pattern into a background, or a combination of both.

A standard embossing machine typically includes two (or more) rollers: an embossing roller and a backing roller. The embossing roller can be laser engraved with a specific pattern that is designed by a graphic designer. The backing roller can have a rubber cover or paper/wool type backing. The print media can pass through the nip between the embossing roller and backing roller. The nip is often pressurized with a hydraulic system. After the embossing process, the print media surface will mimic the design pattern of an embossing roller. The depth of the embossed texture is dependent on a variety of factors such as paper surface property, embossing pressure, machine speed, and engraving depth and pattern.

The technique for embossing a texture, pattern, and/or design onto a media can involve molding the surface of a media by forcing it between a pressure nip formed by embossing rollers. The textured printable media can also be obtained by using embossing cylinders that may be mechanically or chemically etched with a specific pattern and/or design. The textured media can be created using an embossing roller under pressure. The media is altered during texturing by creating embossed depths ranging from about 5 µm to about 90 or 150 µm. In certain specific examples, embossing can produce a peak-valley differential average of about 20 to about 80 µm, about 30 µm to about 70 µm, from about 40 µm to about 60 µm. The Parker Print Surface (PPS) roughness can vary from about 0.45 µm to about 127.5 µm at 1600 psi pressure on the embossing roll, for example. As specific examples, the load and depth of pattern increases the surface roughness. The Confocal microscope Zygo surface roughness can increase from 0.2310 Rq Rz (rmsmic) to 2.0850 Rq Rz (rmsmic). The static coefficient of friction does not typically change but the kinetic coefficient of friction typically slightly decreases as the surface area is reduced. In some examples, the surface roughness of the printable media can be greater than 5 µm per PPS method.

With respect to the liquid vehicle that can be used in preparing the leveling composition, notably water and an organic solvent can be present, and in some examples, surfactant can also be included. The water and organic solvent can be present in the liquid vehicle at a ratio of from 1:1 to 98:2, from 2:1 to 95:5, from 3:1 to 90:10, or from 4:1 to 50:1.

The organic solvent can be any suitable solvent, and is defined to include either a single organic solvent compound or a mixture of organic solvent compounds. The organic solvent can be in a liquid state at room temperature. In one example, the carrier solvent can be a compound having a hydroxyl group, —OH. In one example, the organic solvent can be a water-miscible organic solvent. In one example, the organic solvent(s) can include a short-chain alcohol, short-chain aldehyde, short-chain ketone, short-chain ester, short-chain carboxylic acid, or combinations thereof. "Short-chain," as used herein, refers to any C1-C6 organic compound, having a straight or branched chain. In another example, the organic solvent can be methanol, ethanol, trimethylol propane, propanol, butanol, or combinations thereof. Propanal can include 1-propanol and/or 2-propanol (isopropanol). Butanol can include n-butanol, sec-butanol, isobutanol, and/or tert-butanol. In one example, the organic solvent can include acetone, acetonitrile, acetic acid, 1,4-dioxane, pyridine, butanone, methyl acetate, or any other similar solvent. In other examples, the organic solvent can be glycerin, glyceryl triacetate, 2-ethyl-2-hydroxymethyl-1, 3-propanediol, propylene glycol, polyols, diethylene glycol, tetraethylene glycol, polydextrose, 1,5-pentanediol, 2-pyrrolidone, N-methylpyrrolidone, ethoxylated glycerol, polyethylene glycols, or combination thereof. Other example classes of organic solvents that can be used may include a polyol, a polyol ester, a sugar alcohol, or combinations thereof.

As previously discussed, in one example the organic solvent can be a water-miscible organic solvent. The word "miscible" or "water-miscible" as used herein refers to solvent that can be dissolved in water or otherwise mixed with water at a ratio to form a uniform single-phase liquid composition. In other words, the components of the liquid vehicle can be dissolved or mixed without liquid phase separation. However, other components, such as binders and ionene polymers, may be included in the leveling composition that are not miscible with the liquid vehicle (i.e. these components can be dispersed or suspended in the single-phase liquid composition without being dissolved). The uniform single-phase liquid composition can have a surface energy greater than 85 Dyne/cm, for example.

In one example, the organic solvent is not a water-miscible solvent. For example, the organic solvent can form an emulsion or stable multiple-phase liquid vehicle with water. The multiple-phase liquid vehicle can include emulsifying agents or other stabilizers to maintain a stable multiple-phase liquid vehicle.

In one example, the organic solvent can be present in the leveling composition at from 0.5 wt % to 15 wt %. In another example, the organic solvent can be present in the leveling composition in an amount from 1 wt % to 10 wt %. In another example, the organic solvent can be present in the leveling composition in an amount from 1 wt % to 8 wt %. In another example, the organic solvent can be present in the leveling composition in an amount from 2 wt % to 5 wt %.

The leveling composition can also include surfactant in some examples. Any suitable surfactant can be used, such as anionic surfactant, cationic surfactant, non-ionic surfactant, or combinations thereof. Several commercially available nonionic surfactants that can be used include ethoxylated alcohols such as those from the Tergitol® series (e.g., Tergitol® 15S30, Tergitol® 15S9), manufactured by Dow Chemical; surfactants from the Surfynol® series (e.g. Surfynol® 440 and Surfynol® 465), and Dynol™ series (e.g. Dynol™ 607 and Dynol™ 604) manufactured by Air Products and Chemicals, Inc.; fluorinated surfactants, such as those from the Zonyl® family (e.g., Zonyl® FSO and Zonyl® FSN surfactants), manufactured by E.I. DuPont de Nemours and Company; Alkoxylated surfactant such as Tego® Wet 510 manufactured from Evonik; fluorinated PolyFox® nonionic surfactants (e.g., PF159 nonionic surfactants), manufactured by Omnova; or combinations thereof. Suitable cationic surfactants that may be used in the leveling composition, for example, include long chain amines and/or their salts, acrylated diamines, polyamines and/or their salts, quaternary ammonium salts, polyoxyethylenated long-chain amines, quaternized polyoxyethylenated long-chain amines, and/or combinations thereof.

In one example, the surfactant can be present in the leveling composition in an amount from 0.2 wt % to 6 wt %. In another example, the surfactant can be present in the leveling composition in an amount from 0.3 wt % to 4 wt %. In another example, the surfactant can be present in the leveling composition in an amount from 0.5 wt % to 3 wt %. In another example, the surfactant can be present in the leveling composition in an amount from 0.75 wt % to 2 wt %.

In some examples, the levelling composition can include a flame retardant or fire resistant compound. Any suitable flame retardant can be used. In one example, the flame retardant can be a phosphorus-containing compound. In one example, the flame retardant can be selected from water-soluble phosphorus-containing compounds. One example of a suitable phosphorus-containing compound is a phosphonate ester with a phosphorus-containing closed 4- to 6-membered ring structure. An example of such a compound is 5-ethyl-2-methyl-1,3,2-dioxaphosphorinan-5-yl)methyl dimethyl phosphonate P-oxide, having the following structure:

Another example includes bis[(5-ethyl-2-methyl-1,3,2-dioxaphosphorinan-5-yl)methyl] methyl phosphonate P,P'-dioxide, having the following structure:

Other phosphonate esters with a phosphorus-containing closed 4- to 6-membered ring structure can be selected from some commercial available products, such as FR-102® from Shanghai Xusen Co Ltd, China and AFLAMMIT® from Thor, Germany.

The fire resistant compound can be present, as a percentage of total solids, at from 5 wt % to 50 wt %, or from 10 wt % to 40 wt %, though these ranges are only exemplary and are not intended to be limiting. It is also notable that all of these fire resistant compounds can be used alone or in combination with one another, or further, in combination with phosphor containing esters to provide desired coating characteristics such as viscosity or improved characteristics of the finished product, including enhanced flame resistance and flexibility.

In one example, the flame retardant or fire resistant compound can be present in the total leveling composition in an amount from 0.1 wt % to 10 wt %. In another example, the flame retardant can be present in the leveling composition in an amount from 0.2 wt % to 8 wt %. In another example, the flame retardant can be present in the leveling composition in an amount from 0.3 wt % to 6 wt %. In another example, the flame retardant can be present in the leveling composition in an amount from 0.5 wt % to 4 wt %.

Turning now to the ionene polymer, these are polymers having ionic groups as part of the main chain, meaning that either ionic groups can exist on the backbone unit or ionic groups can exist as an appending group directly attached to an element of the backbone unit, i.e. the ionic group is part of the repeat unit of the polymer. The ionene polymer of the current technology can be either miscible with or dispersible in the liquid vehicle (which includes water, organic solvent, and in some instances, surfactant or other liquids). In one example, the ionene polymer can be dissolved or dispersed in the liquid vehicle after the water and the organic solvent have been mixed together. In another example, the ionene polymer can be dissolved or dispersed in either the water or the organic solvent prior to combining the water and organic solvent to form the liquid vehicle. In some examples where the ionene polymer is dispersed in either the water or organic solvent prior to forming the liquid vehicle, the portion of the liquid vehicle in which the ionene polymer is initially dispersed can also include surfactant and/or other liquids.

In one example, the ionene polymer can be a cationic charged polymer. For example, the ionene polymer can be a naturally occurring polymer such as cationic gelatin, cationic dextran, cationic chitosan, cationic cellulose, or cationic cyclodextrin. The ionene polymer can also be a synthetically modified naturally occurring polymer such as a modified chitosan, e.g., carboxymethyl chitosan or N, N, N-trimethyl chitosan chloride.

In one example, the ionene polymer is a polymer having ionic groups as part of the main chain, such as an alkoxylated quaternary polyamine having the structure:

where R, R1 and A can be the same group or different groups, such as linear or branched C2-C12 alkylene, C3-C12 hydroxyalkylene, C4-C12 dihydroxyalkylene, or dialkylarylene; X can be any suitable counter ion, such as halogen or other similarly charged anions; and m is a numeral suitable to provide a polymer having a weight average molecular weight ranging from 100 Mw to 8000 Mw. The nitrogens can be quaternized in some examples.

In another example, the ionene polymer can be a polymer having ionic groups that append to an element of the backbone unit, such as quaternized poly(4-vinyl pyridine), having the structure:

Again, in this example, the above polymer can repeat to provide a polymer with a weight average molecular weight ranging from 100 Mw to 8000 Mw.

In yet another example, the ionene polymer can include polyamines and/or a salts thereof, polyacrylate diamines, quaternary ammonium salts, polyoxyethylenated amines, quaternized polyoxyethylenated amines, polydicyandiamides, polydiallyldimethyl ammonium chloride polymeric salts, or quaternized dimethylaminoethyl(meth)acrylate polymers. In another example, the ionene polymer can include polyimines and/or salts thereof, such as linear polyethyleneimines, branched polyethyleneimines, or quaternized polyethylenimines. In another example, the ionene polymer can include a substitute polyurea such as poly[bis(2-chloroethyl)ether-alt-1,3 bis[3-(dimethylamino)propyl] urea], or quaternized poly[bis(2 chloroethyl)ether-alt-1,3-bis[3-(dimethylamino)propyl]. In another example, the ionene polymer can be a vinyl polymer and/or a salt thereof, such as quaternized vinylimidazol polymers, modified cationic vinylalcohol polymers, or alkylguanidine polymers.

In one example, the cationic ionene polymer can be present in the leveling composition at from 1 wt % to 10 wt %. In another example, the cationic ionene polymer can be present in the leveling composition at from 2 wt % to 8 wt %. In another example, the cationic ionene polymer can be present in the leveling composition at from 3 wt % to 7 wt %. In another example, the cationic ionene polymer can be present in the leveling composition at from 4 wt % to 6 wt %. Furthermore, in one example, the cationic ionene polymer can have a weight average molecular weight of 100 Mw to 8000 Mw.

In some examples, the leveling composition can also contain a polymeric binder to provide good adhesion between the leveling composition layer and image-receiving layer, if desired. The polymeric binder can be any suitable binder, including non-ionic polymers, cationic charged polymers, or any other suitable binder or mixtures thereof. In one example, the polymeric binder can include a non-ionic polymer such as polyvinyl alcohol, vinyl acetate emulsion, or vinylidene chloride emulsion; or a cationic charged polymer such as cationic starch, polyvinylpyrrolidone, or cationic polyacrylate.

In one example, the polymeric binder can be omitted from the leveling composition, but if present, it can be included typically at from 1 wt % to 10 wt % of the dry weight of the total leveling composition weight. In another example, the polymeric binder can be present in the leveling composition at from 1 wt % to 8 wt %. In another example, the polymeric binder can be present in the leveling composition at from 2 wt % to 5 wt %. In another example, the polymeric binder can be present in the leveling composition at from 3 wt % to 4 wt %.

In one specific example, the leveling composition can be prepared in a shearing mixer. To illustrate one specific example, a leveling composition may include (by weight) 87.5 parts water, 5 parts Floquat® FL 2350 (ionene polymer available from SFN, Inc.), 1 part Zonyl® FSN (fluorosurfactant available from DuPont Co.), 3.5 parts Raycat™ 78 (polymeric binder available from Specialty Polymers), 2 parts of AFLAMMIT® MSG from Thor, Germany, and 3 parts 2-ethyl-2-hydroxymethyl-1,3-propanediol (available from Aldrich, Inc.). Concentrations and specific ingredients can be expanded to the ranges and components disclosed herein, for example. The final solids content after mixing can be about 11 wt % in this example, but a good range may be from about 3 wt % to 25 wt % solids content, or from 5 wt % to 15 wt % solids content. The leveling composition layer can be applied to the substrate samples at a coat weight of 0.2 gsm to 3 gsm, or from 0.5 gsm to 2 gsm, or from 1 gsm to 3 gsm, for example. A lab coater equipped with a Mayer rod application station or other applicator can be used to coat the leveling composition layers, e.g., knife coating device, curtain coating device, etc. Drying can be accomplished in a hot air drying channel or by application of radiant heat, for example. The leveling composition can be applied at an overall range of texture depths at any suitable level. In one example, the levelling composition can be applied at a depth of from 5 to 175 microns, 10 to 150 microns, or from 20 to 120 microns. This can be measured with standard surface profilometry equipment, such as contact stylus or non-contact confocal microscopy, measuring "Rz." This parameter, by definition (ASME Y.14.36M/1996), is the average distance between the highest peak and the lowest valley in each sampling.

As previously discussed, the leveling composition can be applied to a media substrate to prepare an embossed print medium. The media substrate can be prepared from any suitable materials. For example, the supporting media substrate can be made of natural fiber and can include natural cellulose fiber from either a hardwood species alone, or a hardwood species and a softwood species mixed. In one example, a ratio of hardwood fiber to softwood fiber can be within a range of about 100:0 to about 50:50. The natural cellulose fibers may be processed into various pulps including, but not limited to, wood-free pulp, such as bleached or unbleached kraft chemical pulp and bleached or unbleached sulfite chemical pulp; wood-containing pulp, such as one or more of ground wood pulp, thermo-mechanical pulp, and chemo-thermo-mechanical pulp; pulp of non-wood natural fiber, such as one or more of bamboo fiber, bagasse fiber, recycled fiber, cotton fiber; and a combination of two or more pulps, or a mixture of two or more of pulps. The above fiber compositions of the supporting media substrate may comprise both synthetic fibers and natural fibers. An amount of synthetic polymeric fiber over the natural fiber may be within a range of about 10 wt % to about 80 wt % by weight of total fiber. In some examples, the amount of synthetic polymeric fiber by weight of total fiber in the media substrate is about 20 wt % to about 70 wt %, or about 30 wt % to about 60 wt %. In another example, the support substrate is a polymeric film.

In one specific example, with an understanding that these specific materials and weight values are expandable, the media substrate can be fabricated using 100 parts of a fiber mixture that includes about 22 parts of softwood bleached kraft pulp, 65 parts of hardwood bleached kraft pulp, and 13 parts recycled fibers. The mixture of pulps and fibers can be machine broken in water. Both softwood and hardwood kraft pulps can be refined separately using a double disc refiner and mixed with other fibers in the ratio mentioned above. About 20 wt % to about 25 wt % fines having an average length of less than 0.1 mm can be included in the substrate. A mixture of inorganic particles can be added into the fiber furnish to achieve about 13 wt % target ash content. The inorganic particles can include grounded calcium carbonate powder and TiO2 powder in a weight ratio of 10 parts to 1.5 parts. The substrate can be made using a commercial Fourdrinier® paper machine. After the composite web is dried, the web can be brought to a surface size station with a rod metering size press machine. A surface size solution can be applied on the surface of the substrate web and dried.

To these or other media substrates that are capable of receiving and holding an embossed pattern, an image-receiving layer(s) can be applied from an image-receiving layer composition. The function of the image-receiving layer(s) is to provide an acceptable surface so the ink can be deposited onto it and generate acceptable print quality. The image-receiving layer(s) can facilitate both image quality and image durability.

The image-receiving layer can be a single layer or multiple layers with the same or different coating compositions. The total coat weight of the image-receiving layer may fall within any suitable range. In one example, the dry coating weight can be from about 3 gram per square meter (gsm) to about 50 gsm. In another example, the dry coating weight can range from about 5 gsm to about 30 gsm. In another example, the dry coating weight can range from about 5 gsm to about 20 gsm. In another example, the dry coating weight can range from about 10 gsm to about 20 gsm. Application of the coating can be by any method known in the art, including Meyer rod applicator, knife coating applicator, curtain coating applicator, or the like. Once coated, the image-receiving composition dries to form the image-receiving layer. In some examples, the thickness of the image-receiving layer ranges from about 5 microns (μm) to about 40 microns (μm).

In some examples, the image-receiving layer contains pigment filler or fillers. Any suitable pigment filler can be used. The pigment fillers can be either inorganic and/or organic particulates. The pigment fillers can be in solid powder form or they can be dispersed in a slurry. Some non-limiting examples of inorganic pigment fillers include aluminum silicate, kaolin clay, a calcium carbonate, silica, alumina, boehmite, mica, talc, or combinations or mixtures thereof. The inorganic pigment filler can include clay or a clay mixture. The inorganic pigment filler can include a calcium carbonate or a calcium carbonate mixture. The calcium carbonate can be one or more of ground calcium carbonate (GCC), precipitated calcium carbonate (PCC), modified GCC, or modified PCC. The inorganic pigment fillers can also include a mixture of a calcium carbonate and clay. In some examples, the inorganic pigment fillers can include two different calcium carbonate pigments (e.g., GCC and PCC).

Examples of organic pigment filler include, but are not limited to, particles, either existing in a dispersed slurry or in a solid powder, of polystyrene and its copolymers, polymethacrylates and their copolymers, polyacrylates and their copolymers, polyolefins and their copolymers, and combinations thereof. In one example, the pigment filler can include polyethylene, polypropylene, and combinations thereof. Additionally, the pigment fillers can include silica gel (e.g., Silojet® 703C available from Grace Co.), modified (e.g., surface modified, chemically modified, etc.) calcium carbonate (e.g., Omyajet® B6606, C3301, and 5010, all of which are available from Omya, Inc.), precipitated calcium carbonate (e.g., Jetcoat® 30 available from Specialty Minerals, Inc.), or combinations thereof. In one example, the pigments can be present at a dry amount ranging from about 50 wt % to about 95 wt % of the total wt % of the image-receiving layer, or from 65 wt % to 85 wt % of the image-receiving layer.

In each of these cases, the pigment filler can have a particle size ranging from 0.1 μm to 20 μm. In some examples, the pigment filler can have a particle size ranging from 0.2 μm to 18 μm. In some examples, the pigment filler can have a particle size ranging from 0.5 μm to 15 μm.

In some examples, the image-receiving layer includes a polymeric binder. Any suitable polymeric binder can be used. In one example, the polymeric binder can be an aqueous based polymeric binder. Examples of suitable polymeric binders include polyvinyl alcohol, styrene-butadiene emulsion, acrylonitrile-butadiene latex, and combinations thereof. Moreover, in addition to the above binders, other aqueous binders can be added including starch (including oxidized starch, cationized starch, esterified starch, enzymatically denatured starch, and so on), gelatin, casein, soybean protein, cellulose derivatives including carboxymethyl cellulose, hydroxyethyl cellulose and the like; acrylic emulsion, vinyl acetate emulsion, vinylidene chloride emulsion, polyester emulsion, and polyvinylpyrrolidone. Other examples of suitable polymeric binders include aqueous based binders such as polyvinyl alcohol (examples of which include Kuraray Poval® 235, Mowiol® 40-88, and Mowiol® 20-98 available from Kuraray America, Inc.), styrene-butadiene emulsions, acrylonitrile-butadiene latex, and combinations thereof. In one example, the amount of the polymeric binder present in the image-receiving layer can be from about 5 to about 40 parts per 100 parts of pigment filler by dry weight. In other examples, the amount of polymeric binder ranges from about 7 parts to about 40 parts per 100 parts of the pigment filler by dry weight, or about 10 parts to about 40 parts per 100 parts of the pigment filler by dry weight, or about 15 parts to about 40 parts per 100 parts of the pigment filler by dry weight. In some examples, the amount of polymeric binder in the image receiving layer ranges from about 5 parts to about 35 parts per 100 parts of the pigment filler by dry weight, or about 5 parts to about 30 parts per 100 parts of the pigment filler by dry weight, or about 5 parts to about 25 parts per 100 parts of the pigment filler by dry weight.

In another example, the image-receiving layer can be a "polymer-rich" composition. A "polymer-rich" composition, as described herein, refers to a composition where the weight percentage of the polymeric fraction in the composition is no less than 20% by weight. In another example, the polymeric fraction of the composition is no less than 40% by weight. A polymer rich composition can provide a printing media with excellent performance in the areas of ink durability and stain resistance.

Polymer-rich compositions can include a poly-alkene compound, such as a poly-alkene homopolymer, a poly-alkene copolymer, a modified poly-alkene, and combinations thereof. By definition, a "poly-alkene," as described herein, refers to a polymeric material formed via polymerization of an alkene monomer, i.e., $C_nH_{2n}$ and its derivatives, where n is within a range of about 7,000 to about 20,000. Some non-limiting examples of poly-alkenes that can be used include polyethylene homopolymer, polypropylene homopolymer, polytetrafluoroethylene (PTFE), polyamide, amide-modified polyethylene, amide-modified polypropylene, PTFE-modified polyethylene, PTFE-modified polypropylene, maleic anhydride-modified polyethylene, maleic anhydride-modified polypropylene, oxidized polyethylene, oxidized polypropylene, chloride polyethylene, chloride polypropylene, and combinations thereof.

The polymer-rich composition can also include any polymer that shows a strong capability to make a laminating composition on the supporting media substrate, or on the surface of the next layer. Some examples of such polymers include, but are not limited to, polyvinyl alcohol, styrene-butadiene emulsion, acrylonitrile-butadiene latex, and any combinations thereof. In addition to the above binders, other aqueous binders can be added including: starch (including oxidized starch, cationized starch, esterified starch, enzymatically denatured starch and so on), gelatin, casein, soybean protein, cellulose derivatives including carboxymethyl cellulose, hydroxyethyl cellulose and the like;

acrylic emulsion, vinyl acetate emulsion, vinylidene chloride emulsion, polyester emulsion, and polyvinylpyrrolidone. Other examples of suitable polymeric binders include aqueous based binders such as polyvinyl alcohol (examples of which include Kuraray Poval® 235, Mowiol® 40-88, and Mowiol® 20-98 available from Kuraray America, Inc.), styrene-butadiene emulsions, acrylonitrile-butadiene latex, and combinations thereof. In another example, the polymer-rich composition can include a cross-linkable polymer such as polyurethane, acrylic-urethane hybrid polymers, and epoxy based polymers.

The image-receiving layer can also include a latex film-forming agent. The latex film-forming agent of the image-receiving layer is provided to facilitate forming a film of a latex ink (i.e., an image) that may be subsequently deposited on the print medium as an image. The latex film-forming agent may be any kind of chemical agent having water compatibility and temperature volatility that is capable of lowering an elastic modulus of ink latex particulates and of providing temporary plasticization to promote polymer chain motion to enhance forming a latex ink film from latex ink particulates. Representative examples of latex film-forming agents include, but are not limited to, citrate or sebacate compounds, ethyoxy alcohols, glycol oligomers and other low molecular weight polymers, glycol ether, glycerol acetals, surfactants that are either anionic, cationic, or non-ionic and have a backbone of more than 12 carbons, cyclic amide-like lactams, e.g., β-lactam, γ-lactam, and δ-lactam, a combination of two or more thereof, or a mixture of two or more thereof. In some examples, the latex ink film-forming agent is a cyclic amide-like lactam such as β-lactam, γ-lactam, and δ-lactam, or a mixture thereof. In an example, the latex ink film-forming agent is a γ-lactam. Representative examples of a γ-lactam include, but are not limited to, N-methyl-2-pyrrolidone, 5-methyl-2-pyrrolidone, and 2-pyrrolidone.

A ratio of an amount of the pigment filler to an amount of the film forming agent may be (by weight) within a range of about 200:1 to about 10:1. In some examples, the ratio of the amounts of the pigment filler to the film forming agent is within the range of about 150:1 to about 10:1, or about 100:1 to about 10:1, or about 80:1 to about 10:1, or about 65:1 to about 10:1, or about 50:1 to about 10:1, or about 35:1 to about 10:1. In some examples, the ratio of the amounts of the pigment filler to the film forming agent is within the range of about 200:1 to about 15:1, or about 200:1 to about 20:1, or about 200:1 to about 25:1, or about 200:1 to about 30:1, or about 200:1 to about 35:1, or about 200:1 to about 40:1. In some examples, the ratio of the amounts of the pigment filler to the film forming agent is within the range of about 100:1 to about 11:1, or about 50:1 to about 12:1, or about 35:1 to about 13:1, or about 30:1 to about 14:1.

In one specific example, though material choices and ranges outside of the amounts given can be expanded as described herein, the image-receiving composition can be prepared in a high shear mixer. The image-receiving composition can include about 80 parts Hydrocarb® 60 (available from Omya NA), 20 parts Hydrocarb® 90 (available from Omya NA), 15 parts Acronal® 866 (available from BASF), 1 part 2-pyrrolidinone (available from Aldrich, Inc.), 0.5 parts Byk-Dynwet® 800 (available from BYK, Inc.), and 0.2 parts BYK® 024 (available from BYK, Inc.). The final solids content after mixing can be from 25 wt % to 75 wt %, e.g., 52 wt %, and the viscosity can be from 120 to 250 centipoise (cps), e.g., 180 cps, as measured by a Brookfield viscometer at 100 rpm. The image-receiving layer can be applied to the media substrate samples at a coat weight of 3 gsm to 50 gsm, e.g., 20 gsm with a multi-structured coating. A production coater equipped with Mayer rod application station can be used to coat the coating layers with a wet-on-dry sequence. Drying can be accomplished in an 8 meter hot air drying channel with a total coating speed of 30 meters per minute.

As mentioned, the leveling composition is applied to the image-receiving layer, and in some examples, directly to the image-receiving layer. In one specific example, the addition of a leveling composition layer to an image-receiving layer at a dry coating weight of from 0.2 gsm to 3 gsm can improve the print quality (reduce puddling of ink) of an embossed print medium compared to an embossed print medium with only an image-receiving layer (i.e. without a leveling composition layer). In one specific example, a leveling composition layer with a dry coating weight of from 1 gsm to 3 gsm can improve the print quality of an embossed print medium more than an embossed print medium with a leveling composition layer at 0.5 gsm dry coating weight.

Figure 1:
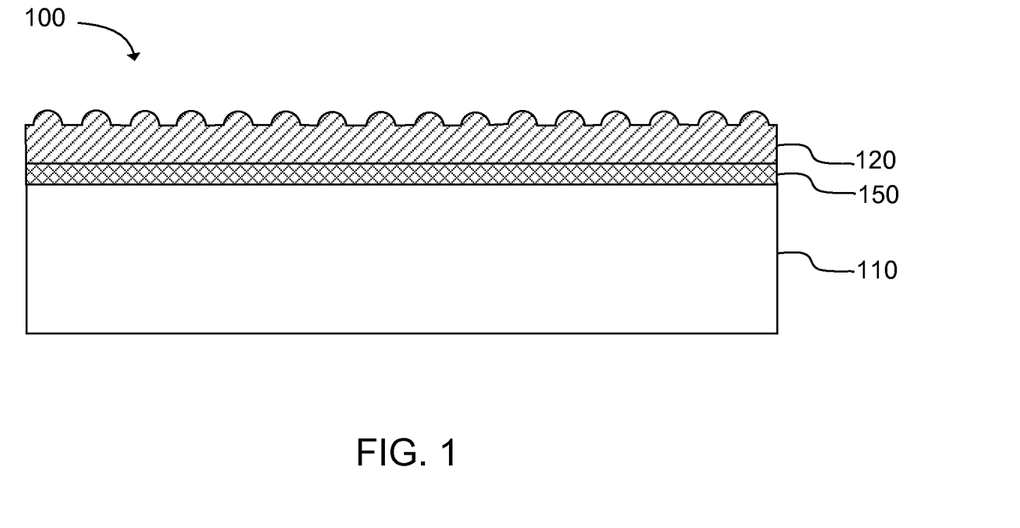
FIG. 1 is a cross-sectional view of an embossed print medium with an image-receiving layer, but without a leveling composition layer, in accordance with examples of the present disclosure.

Turning now to the figures, FIG. 1 shows an example of an embossed print medium 100. The media substrate 110 has been coated with an image-receiving layer 120. Optionally, a base layer 150 can be included with the print medium 120, which is coated over the media substrate. In accordance with examples of the present disclosure, the base layer can be considered to be part of the media substrate in some examples. As can be seen from FIG. 1, the image-receiving layer has been embossed to provide the embossed print medium with a textured surface. However, the embossed print medium 100 does not include the leveling composition layer. Absence of the leveling composition layer can result in ink puddling and associated undesirable printing effects.

Figure 2:
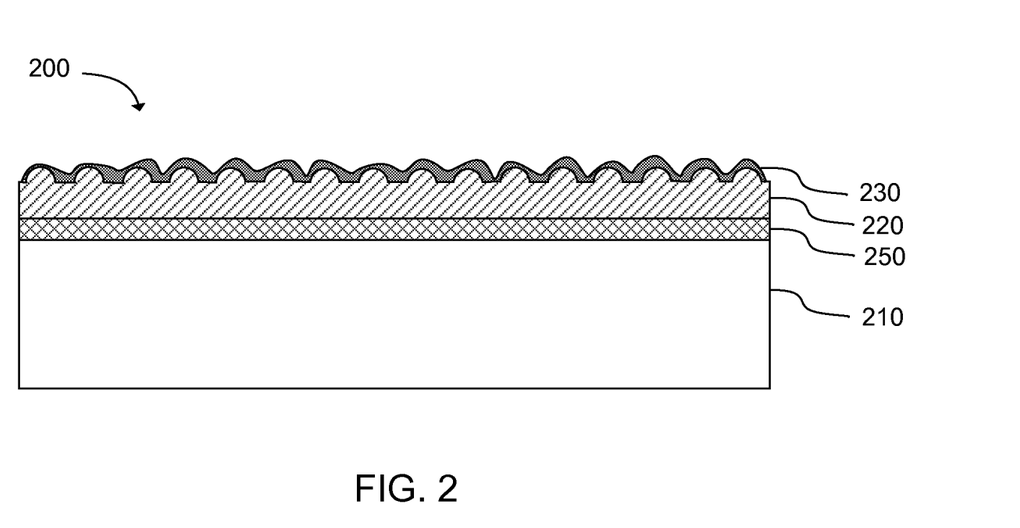
FIG. 2 is a cross-sectional view of an embossed print medium as shown in FIG. 1, but which includes a leveling composition layer that was applied after the print medium was embossed in accordance with examples of the present disclosure.

In contrast, FIG. 2 shows an example of an embossed print medium 200 that includes a media substrate 210, an image-receiving layer 220, and a leveling composition layer 230. In one example, a base layer 250 can be included with the print medium 220. The leveling composition layer 230 can minimize ink puddling and generate a much more aesthetically pleasing print quality. This particular example represents an embodiment where the print medium was embossed prior to the application of the leveling composition layer, as can be seen by the leveling composition not following the embossing imprint precisely.

Figure 3:
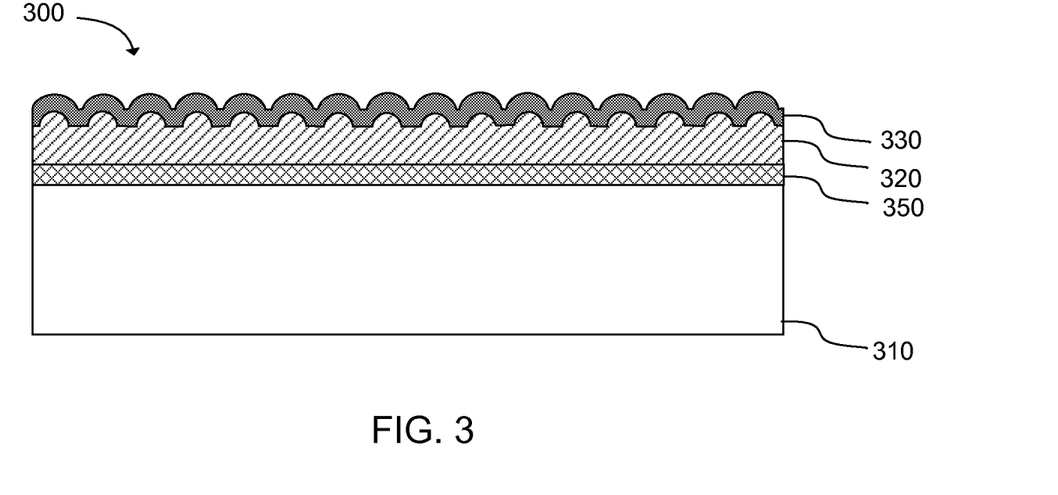
FIG. 3 shows a cross-sectional view of an embossed print medium that includes an image-receiving layer and a leveling composition layer that were applied before the print medium was embossed in accordance with examples of the present disclosure.

FIG. 3 shows another example of an embossed print medium 300. This embodiment also includes a media substrate 310, an image-receiving layer 320, and a leveling composition layer 330. In one example, a base layer 350 can be included with the print medium 320. In contrast to FIG. 2, FIG. 3 represents an embodiment where the print medium was embossed after the leveling composition layer was applied, as shown by the leveling composition layer embossing more closely following the surface of the image-receiving layer. Notably, these FIGS. are schematic in nature, so it should not be inferred that embossing would not have an impact on how the layers interface. Rather, what is suggested is that the presence of the leveling composition over an image-receiving layer in an embossed format provides superior results with respect to ink puddling compared to an image-receiving layer without a leveling composition overcoat.

Figure 4:
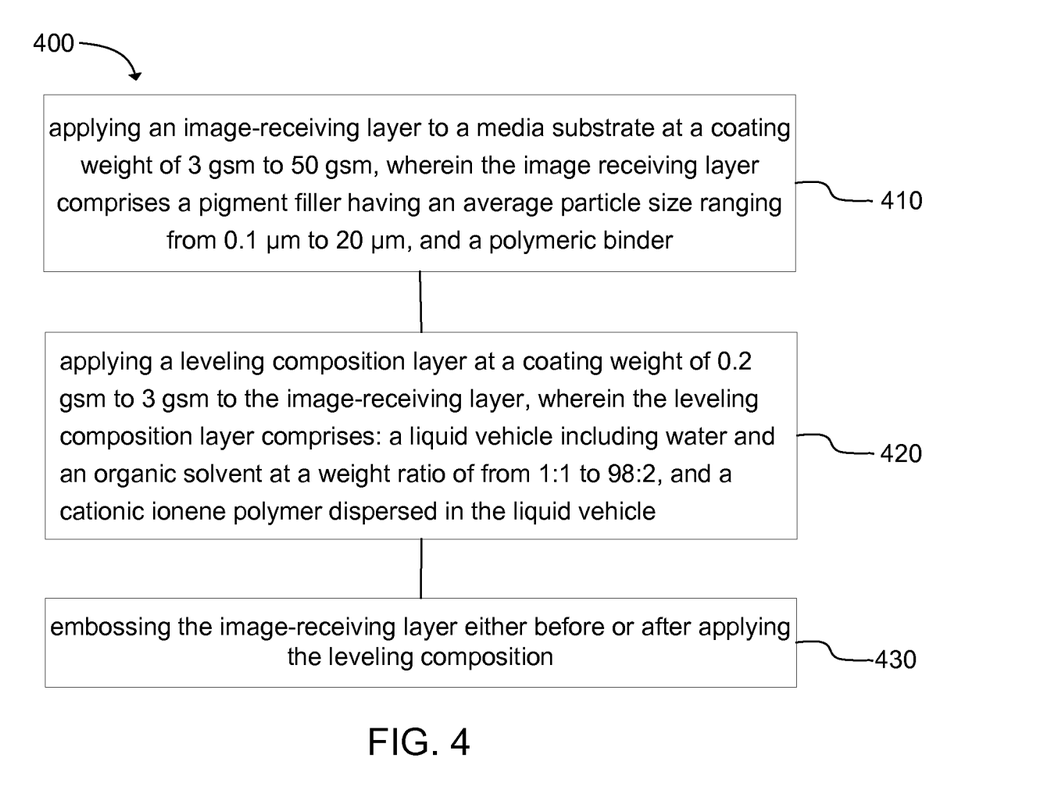
FIG. 4 illustrates a method of preparing an embossed print medium in accordance with examples of the present technology.

FIG. 4 depicts a method 400 of preparing an embossed print medium. The method includes various steps, which may or may not follow any particular order. Steps can include applying 410 an image-receiving layer to a media substrate at a coating weight of 3 gsm to 50 gsm, applying 420 a leveling composition layer to the image-receiving layer at a coating weight of 0.2 gsm to 3 gsm, and embossing 430 either the image-receiving layer or the leveling composition layer after application. The image-receiving layer can include a pigment filler having an average particle size ranging from 0.1 μm to 20 μm and a polymeric binder. The leveling composition that is applied to the image-receiving layer can include a liquid vehicle including water and an organic solvent, and a cationic ionene polymer dispersed in the liquid vehicle. In one example, the image-receiving layer is embossed prior to application of the leveling composition layer, and in another example, the image-receiving layer is embossed after application of the leveling composition, i.e. through the leveling composition.

It is noted that, as used in this specification and the appended claims, the singular forms "a," "an," and "the" include plural referents unless the content clearly dictates otherwise.

"Substrate" or "media substrate" includes any base material that can be coated in accordance with examples of the present disclosure, such as film base substrates, polymer substrates, conventional paper substrates, photobase substrates, offset media substrates, and the like. Further, pre-coated and film coated substrates can be considered a "substrate" that can be likewise be coated in accordance with examples of the present disclosure.

As used herein, the term "about" is used to provide flexibility to a numerical range endpoint by providing that a given value may be "a little above" or "a little below" the endpoint. The degree of flexibility of this term can be dictated by the particular variable and can be determined based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, dimensions, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a weight ratio range of about 1 wt % to about 20 wt % should be interpreted to include not only the explicitly recited limits of 1 wt % and about 20 wt %, but also to include individual weights such as 2 wt %, 11 wt %, 14 wt %, and sub-ranges such as 10 wt % to 20 wt %, 5 wt % to 15 wt %, etc.

As a further note, in the present disclosure, it is noted that when discussing the levering compositions, the embossed print medium, and the method of preparing the embossed print medium, each of these discussions can be considered applicable to each of these examples, whether or not they are explicitly discussed in the context of that example. Thus, for example, in discussing details about the levering compositions per se, such discussion also refers to the embossed print medium and method of preparing an embossed print medium described herein, and vice versa.

The following illustrate examples of the disclosure. However, it is to be understood that these examples are merely exemplary or illustrative of the application of the principles of the present disclosure. Numerous modifications and alternative compositions, methods, and systems may be devised by those skilled in the art without departing from the spirit and scope of the present disclosure. The appended claims are intended to cover such modifications and arrangements.

EXAMPLES

Example 1

Media Substrate

A media substrate was prepared using 100 parts of a fiber mixture that includes about 22 parts of softwood bleached kraft pulp, 65 parts of hardwood bleached kraft pulp, and 13 parts recycled fibers. The mixture of pulps and fibers were machine broken in water. Both softwood and hardwood kraft pulps were refined separately using a double disc refiner and mixed with other fibers. About 20 wt % to about 25 wt % fines having an average length of less than 0.1 mm were included in the substrate. A mixture of inorganic particles were added into the fiber furnish to achieve about 13 wt % target ash content. The inorganic particles included grounded calcium carbonate powder and $TiO_2$ powder at a weight ratio of 10 parts to 1.5 parts. The substrate was made using a commercial Fourdrinier paper machine. After the composite web was dried, the web was brought to a surface size station with a rod metering size press machine. A surface size solution was applied on the surface of the substrate web and dried.

Example 2

Image-Receiving Layer

An image receiving layer was prepared to coat on the media substrate described in Example 1 according to the following table:

TABLE 1

Image-Receiving Composition

| Ingredient | Suppliers | Amount (Parts by Weight) |
|---|---|---|
| Hydrocarb ® 60 | Calcium carbonate pigment fillers from Omya NA | 80 |
| Hydrocarb ® 90 | Calcium carbonate pigment fillers from Omya NA | 20 |
| Acronal ® 866 | Styrene-acrylic substance from BASF Corporation | 15 |
| 2-pyrrolidinone | Aldrich Inc. | 1 |
| Byk-Dynwet ® 800 | Silicone-free wetting agent from BYK Inc. | 0.5 |
| BYK ®-024 | VOC-free silicone defoamer from BYK Inc. | 0.2 |

The image-receiving composition was prepared in a high shear mixer. The final solids content after mixing was 52 wt % and the viscosity was 180 centipoise (cps), as measured by a Brookfield viscometer at 100 rpm. The image-receiving layer was applied to the media substrate samples at a coat weight of 20 gsm with a multi-structured coating. A production coater equipped with Mayer rod application station was used to coat the coating layers with a wet-on-dry sequence. Drying was accomplished in an 8 meter hot air drying channel with a total coating speed of 30 meters per minute.

Example 3

Leveling Composition

The leveling composition layer was prepared and applied from a leveling composition according to Table 2, as follows:

TABLE 2

Leveling Composition

| Ingredient | Suppliers | Amount (Parts) |
|---|---|---|
| H$_2$O | Lab De-ionic water | 87.5 |
| Floquat ® FL 2350 (cationic ionene polymer) | SFN Inc | 5 |
| Zonyl ® FSN (fluorosurfactant) | DuPont Co | 1 |
| Raycat ™ 78 (polymer binder) | Specialty Polymers | 3.5 |
| 2-ethyl-2-hydroxymethyl-1,3-propanediol (organic solvent) | Aldrich Inc | 3 |

Note—In one example, the leveling composition of Table 2 can be modified with the addition of a phosphorus-containing flame retardant, e.g., about 2 wt % Aflammit® MSG from Thor Ltd, Germany.

The leveling composition was prepared in a shearing mixer. The final solids content after mixing was about 11 wt %. The leveling composition layer was applied to the substrate samples at a coat weight of 1 gsm to 3 gsm. A lab coater equipped with a Mayer rod application station was used to coat the leveling composition layers. Drying was carried out using a hot air drying channel.

The leveling coating can be applied either before or after embossing. However, in the current examples, the substrate was embossed with an embossing machine after coating the image-receiving layer (but before the leveling composition was applied), as shown in FIG. 2. The embossing left a peak-valley differential average of about 50 microns. The overall range of texture depths at which the levelling composition was applied was from 10 to 150 microns. This can be measured with standard surface profilometry equipment, such as contact stylus or non-contact confocal microscopy, measuring "Rz." This parameter, by definition (ASME Y.14.36M/1996), is the average distance between the highest peak and the lowest valley in each sampling.

Example 4

Print Quality and Puddling Evaluation

The embossed print media prepared in accordance with Example 3 (Sample A) was evaluated against other print media that did not include the leveling composition (Sample B), was not embossed (Sample C), or was not embossed and the leveling composition not applied (Sample D). Each sample was printed on using a 60-inch wide, large format, thermal inkjet printer with a 6-ink color system: cyan, magenta, yellow, black, light cyan, and light magenta. Each of the inks was a pigmented aqueous ink with added latex for durability. The print mode was a 16-pass, bidirectional, in native color mode (no color rendering), and the heater was at setpoints of 50° C. and 110° C.

Each sample was examined visually by multiple inspectors under a controlled light box with D65 fluorescent lighting following an established procedure, i.e. ISO 10526:1999/CIE 5005/E-1998. Apart from generating numeric data, like optical density and gamut, the inspectors looked specifically for overall image quality and gave each of the samples a simple rating from 1 (poor image quality) to 5 (good image quality). For this test specifically, 1 was attributed to ink puddling, which is where the ink density appears higher in the troughs or valleys of the texture and less on the peaks of the texture. Scores 2, 3, and 4 differentiate puddling levels in decreasing order, and a score of 5 was attributed with uniform coverage of the ink in both the valleys and the peaks of the embossed texture.

Sample A was prepared as described in Example 3. The media substrate was coated with an image-receiving layer, and the print medium was subsequently embossed. A leveling composition layer was then applied to the print medium. Finally, the print medium was printed and evaluated. Sample A received a print rating of 5.

Sample B was prepared in the same way as Sample A, except the leveling composition layer was not applied to the print medium. Sample B received a print rating of only 1.

Sample C was prepared in the same way as Sample A, except the print medium was not embossed. Sample C received a print rating of 5.

Sample D was prepared in the same way as Sample A, except that print medium was not embossed and the leveling composition layer was not applied. Sample D received a print rating of 5.

These examples illustrate that applying the leveling composition layer still provides good image quality when there is no embossing present (Sample C). Further, the image quality remains high without the leveling composition when the print medium is not embossed (Sample D), indicating that the embossing introduces the problems of puddling associated with poor image quality. In other words, without embossing, there is no need for the leveling composition. However, when the media is embossed, the leveling composition has the impact of making acceptable an otherwise poor surface for achieving high print quality.

Example 5

Various coating weights of a leveling composition layer were applied to an embossed print medium to determine what levels would be effective at overcoming ink puddling. Four leveling composition layer coating weights were applied and visually assessed with the print rating scale described above in Example 4. Specifically, coating weights of 0.5 gsm, 1 gsm, 1.5 gsm, and 2 gsm were tested.

The coating weight of 0.5 gsm received a print rating of 4, which is very good. However, coating weights of 1 gsm, 1.5 gsm, and 2 gsm all received print ratings of 5. This example illustrates that even very small coating weights of the leveling composition can significantly improve the overall print quality on an embossed print medium. Even though a coating weight of 0.5 gsm received a print rating of 4, the print quality was still improved over Sample B in Example 4 (from 1 to 4) where the print medium was embossed, but no leveling composition layer was applied.

This technology has been described with reference to certain examples, and those skilled in the art will appreciate that various modifications, changes, omissions, and substitutions can be made without departing from the spirit of the disclosure. It is intended, therefore, that the present disclosure be limited only by the scope of the following claims.

What is claimed is:

1. A leveling composition, comprising:
    from 80 wt % to 95 wt % water;
    from 0.5 wt % to 15 wt % organic solvent;
    from 0.2 wt % to 6 wt % surfactant;
    from 1 wt % to 10 wt % cationic ionene polymer having a weight average molecular weight from 100 Mw to 8000 Mw; and
    from 1 wt % to 10 wt % polymeric binder wherein the leveling composition has a surface energy greater than 85 Dyne/cm.

2. The leveling composition of claim 1, wherein the leveling composition is devoid of colorant.

3. The leveling composition of claim 1, wherein the cationic ionene polymer is a cationic gelatin, cationic dextran, cationic chitosan, cationic cellulose, cationic cyclodextrin, carboxymethyl chitosan, N, N, N-trimethyl chitosan chloride, alkoxylated quaternary polyamines, polyamines, polyamine salts, polyacrylate diamines, quaternary ammonium salts, polyoxyethylenated amines, quaternized polyoxyethylenated amines, polydicyandiamide, polydiallyldimethyl ammonium chloride polymeric salt, quaternized dimethylaminoethyl(meth)acrylate polymers, polyethyleneimines, branched polyethyleneimines, quatemized polyethylenimine, polyurias, poly[bis(2-chloroethyl)ether-alt-1,3bis[3-(dimethylamino)propyl]urea], quaternized poly[bis(2 chloroethyl)ether-alt-1,3-bis[3-(dimethylamino)propyl], vinyl polymers or salts thereof, quaternized vinylimidazol polymers, modified cationic vinyl alcohol polymers, alkylguanidine polymers, or a combination thereof.

4. The leveling composition of claim 1, wherein the water is be present at from 85 wt % to 90 wt %, the organic solvent is present at from 1 wt % to 10 wt %, the surfactant is present at from 0.3 wt % to 3 wt %, the cationic ionene polymer is present at from 2 wt % to 8 wt %, and the polymeric binder is present at from 1 wt % to 8 wt %.

5. The leveling composition of claim 1, wherein the organic solvent is 2-ethyl-2-hydroxymethyl-1,3-propanediol.

6. The leveling composition of claim 1, wherein the composition has a solids content from 5 wt % to 15 wt %.

7. The leveling composition of claim 1, wherein the leveling composition further comprises a phosphorous-containing flame retardant.

8. The leveling composition of claim 7, wherein the phosphorus-containing flame retardant is present in an amount from 0.5 wt % to 4 wt %.

* * * * *